United States Patent
Axinte et al.

(10) Patent No.: US 12,434,394 B2
(45) Date of Patent: Oct. 7, 2025

(54) MICROMANIPULATOR

(71) Applicant: ROLLS-ROYCE PLC, London (GB)

(72) Inventors: Dragos A Axinte, Nottingham (GB);
Erhui Sun, Nottingham (GB); Andres A Gameros Madrigal, Nottingham (GB); Abdelkhalick Mohammad, Nottingham (GB); Tianyi Zeng, Nottingham (GB); Max B Keedwell, Bristol (GB); Josue Israel Camacho Arreguin, Nottingham (GB)

(73) Assignee: ROLLS-ROYCE plc, London (GB)

( * ) Notice: Subject to any disclaimer, the term of this patent is extended or adjusted under 35 U.S.C. 154(b) by 169 days.

(21) Appl. No.: 18/378,322

(22) Filed: Oct. 10, 2023

(65) Prior Publication Data
US 2024/0149472 A1    May 9, 2024

(30) Foreign Application Priority Data
Nov. 3, 2022 (GB) ................................ 2216347

(51) Int. Cl.
*B25J 15/00* (2006.01)
*B23K 37/02* (2006.01)
(Continued)

(52) U.S. Cl.
CPC ....... *B25J 17/0283* (2013.01); *B23K 37/0229* (2013.01); *B25J 9/1679* (2013.01); *B25J 15/0019* (2013.01)

(58) Field of Classification Search
CPC .............. B23K 37/0229; B25J 17/0283; B25J 15/0019; B25J 17/0258; B25J 9/1015; B25J 17/0266; B25J 9/1679; B25J 7/00
See application file for complete search history.

(56) References Cited

U.S. PATENT DOCUMENTS

| 4,805,477 A | 2/1989 | Akeel |
| 5,239,883 A | 8/1993 | Rosheim |

(Continued)

FOREIGN PATENT DOCUMENTS

CN    112873266 B    5/2022

OTHER PUBLICATIONS

Weckx et al., Prototype design of a novel modular two-degree-of-freedom variable stiffness actuator, 2014, IEEE, p. 33-38 (Year: 2014).*

(Continued)

*Primary Examiner* — Marc Mcdieunel
(74) *Attorney, Agent, or Firm* — Oliff PLC (57) ABSTRACT

A micromanipulator for mounting on the end of a macro-manipulator, the micromanipulator comprising: a connection plate with a at least a first and second motor connected to a rigidly mounted base section, a first rotational section connected to the base section about a pivotable axis, the first rotational section being further connected to a slider rod which is connected to the first motor, and a second rotational section connected to the first rotational section about a pivotable axis, the second rotational section being further connected to a slider rod which is connected to the second motor and wherein the rotational joints between the base section and first joint section and the rotational joint between the first and second rotational sections are offset by 90°.

12 Claims, 5 Drawing Sheets

(51) Int. Cl.
B25J 9/16 (2006.01)
B25J 17/02 (2006.01)

(56) References Cited

U.S. PATENT DOCUMENTS

| | | | | |
|---|---|---|---|---|
| 6,436,107 | B1* | 8/2002 | Wang | A61B 34/30 |
| | | | | 606/139 |
| 6,699,177 | B1* | 3/2004 | Wang | A61B 34/77 |
| | | | | 600/102 |
| 7,074,179 | B2* | 7/2006 | Wang | A61B 34/37 |
| | | | | 414/2 |
| 7,083,571 | B2* | 8/2006 | Wang | A61B 34/71 |
| | | | | 600/102 |
| 7,914,521 | B2* | 3/2011 | Wang | A61B 34/70 |
| | | | | 606/1 |
| 8,147,414 | B2* | 4/2012 | Abraham | A61B 8/445 |
| | | | | 600/459 |
| 9,591,964 | B2* | 3/2017 | Choset | A61B 1/008 |
| 2009/0173177 | A1 | 7/2009 | Sugawara et al. | |

OTHER PUBLICATIONS

Shao et al., Structural design of a kind of palletizing robot with double-drive mechanical-arm and large lifting force, 2017, IEEE, p. 133-138 (Year: 2017).*

Rosheim, Design of an omnidirectional arm, 1990, IEEE, p. (Year: 1990).*

Tam et al., Design and development of a multiple DOF compliant robot, 2005, IEEE, p. 876-881 (Year: 2008).*

Apr. 2, 2024 Search Report issued in European Patent Application No. 23201350.8.

May 3, 2023 Search Report issued in British Patent Application No. 2216347.1.

Ulrich Schneider et al. "Experimental Investigation of Sources of Error in Robot Machining". WRSM 2013, pp. 14-26.

"Robotic Welding". <URL: https://www.kemppi.com/en-US/support/welding-abc/robotic-welding/#783e762f>, accessed Sep. 21, 2023.

R.P. Manorathna et al. Feature Extraction and Tracking of a Weld Joint for Adaptive Robotic Welding. 2014 13th International Conference on Control, Automation, Robotics & Vision, Dec. 10-12, 2014, pp. 1368-1372.

Constantin Dumitrascu et al. "Optimized Overall Design of a Robotic Arc Welding Cell and Calculation Procedures for Optimal Selection of IR Motors". Proceedings in Manufacturing Systems, 2021, vol. 16, issue 2, pp. 75-88.

"KUKA READY2_ARC". <URL: https://www.kuka.com/en-us/products/robotics-systems/kuka-ready2_use/kuka-ready2_arc>, accessed Sep. 21, 2023.

"Migatronic Welding Value". <URL: https://web.archive.org/web/20220121225636//www.migatronic.com/en/products-and-solutions/welding-machines/cowelder>, accessed Sep. 27, 2023.

* cited by examiner

MICROMANIPULATOR

This specification is based upon and claims the benefit of priority from UK Patent Application Number 2216347.1 filed on 3 Nov. 2022, the entire contents of which are incorporated herein by reference.

BACKGROUND

Overview of the Disclosure

The disclosure relates to a micromanipulator for attachment to a manipulator arm or a robot. In particular, the disclosure relates to a robotic arm and head for use in complex welding processes.

Background of the Disclosure

Welding is used in a large number of engineering processes to join components together and for repair of components. There are many different welding operations that can be used in these processes. For example, in the repair of aerospace components Gas Metal Arc Welding is commonly used. This is a complex process and requires highly specialised and experienced human operators, which take a long time to train and are limited in terms of areas in which they can be used. As such, they are not suitable for work in highly constrained spaces where repair may be required. In these cases, the object being worked on needs to be disassembled so that the operator can work on it. This can be an expensive and timely process, which is not always desirable. Historically, welding methodologies were typically based on human intervention, however, the recent progress in robotics, artificial intelligence, computer vision and autonomous control have enabled the transition from human based welding to automated welding. Automated welding allows robots to imitate the welding tasks that are performed by the skilled human operator.

Robots represent a possibility to replace highly qualified human operators. In order to do this a welding tool can be mounted at the end effector of the robot; however, there are still limitations with this process. This is because conventionally the welding tool is mounted to the end effector of heavy and bulky robots which limits the manipulation and usability of the end effector. As such, the robots work well in easy to access areas where the robots can move at high speeds. However, this limits their application to easy to access areas, reduced operation speeds and relatively simple paths to prevent inertial effects. Challenges still exist in developing a successful system based on robotics which can access confined spaces or work on more complex weld paths. These limitations are in part because such a system must be able to adapt to changes in the weld position. As such, there is a requirement to develop a welding system that can operate in confined spaces and/or is able to work on complex weld paths.

SUMMARY OF THE DISCLOSURE

According to a first aspect of the disclosure there is presented a micromanipulator for mounting on the end of a macromanipulator, the micromanipulator comprising:
 a connection plate with a at least a first and second motor connected to a rigidly mounted base section, a first rotational section connected to the base section about a pivotable axis, the first rotational section being further connected to a slider rod which is connected to the first motor, and a second rotational section connected to the first rotational section about a pivotable axis, the second rotational section being further connected to a slider rod which is connected to the second motor and wherein the rotational joints between the base section and first joint section and the rotational joint between the first and second rotational sections are offset by 90°.

A tool may be connected to the second rotational section.

The tool may be a welding torch having a gas supply and an igniter.

The tool may be a gas metal arc welding tool.

A wire feeder may be connected to the welding torch.

The base section may be held in position by at least two rigid rods mounted to the upper plate.

The base section may be mounted to a housing which is connected to the upper plate and surrounds the motors.

The first and second motors may be DC motors or servo motors.

The slider rods may have a break with a connector section to offset the position of a distal end of the slider rod to a proximal end.

According to a second aspect of the disclosure there is provided a robotic arm tool, comprising a 6 degrees of freedom robot having positionally manipulatable sections and wherein at the distal end is a micromanipulator according to the discussion above.

The robotic arm tool may be connected to a robot arm controller, which is in turn connected to a computer, having a program for controlling the robotic arm tool.

According to a third aspect of the disclosure there is provided a method of using a robotic arm tool according to the second aspect of the disclosure, comprising:
 the computer is programmed to perform the desired task;
 the robot arm is moved from its initial position to the desired position to start the process;
 the computer controls the robotic controller to manipulate the actuators to trace a desired path along the component, whilst signals are provided to the micromanipulator to provide fine movement of the end effector for accurate control of the tool; and
 the process is completed and the signal to the micromanipulator is turned off.

The computer may also control the tool that is connected to the end of the micromanipulator.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE DRAWINGS

Embodiments will now be described by way of reference only, with reference to the figures in which.

DETAILED DISCUSSION OF THE DISCLOSURE

Aspects and embodiments of the present disclosure will now be discussed with reference to the accompanying figures. Further aspects and embodiments will be apparent to those skilled in the art.

Figure 1:
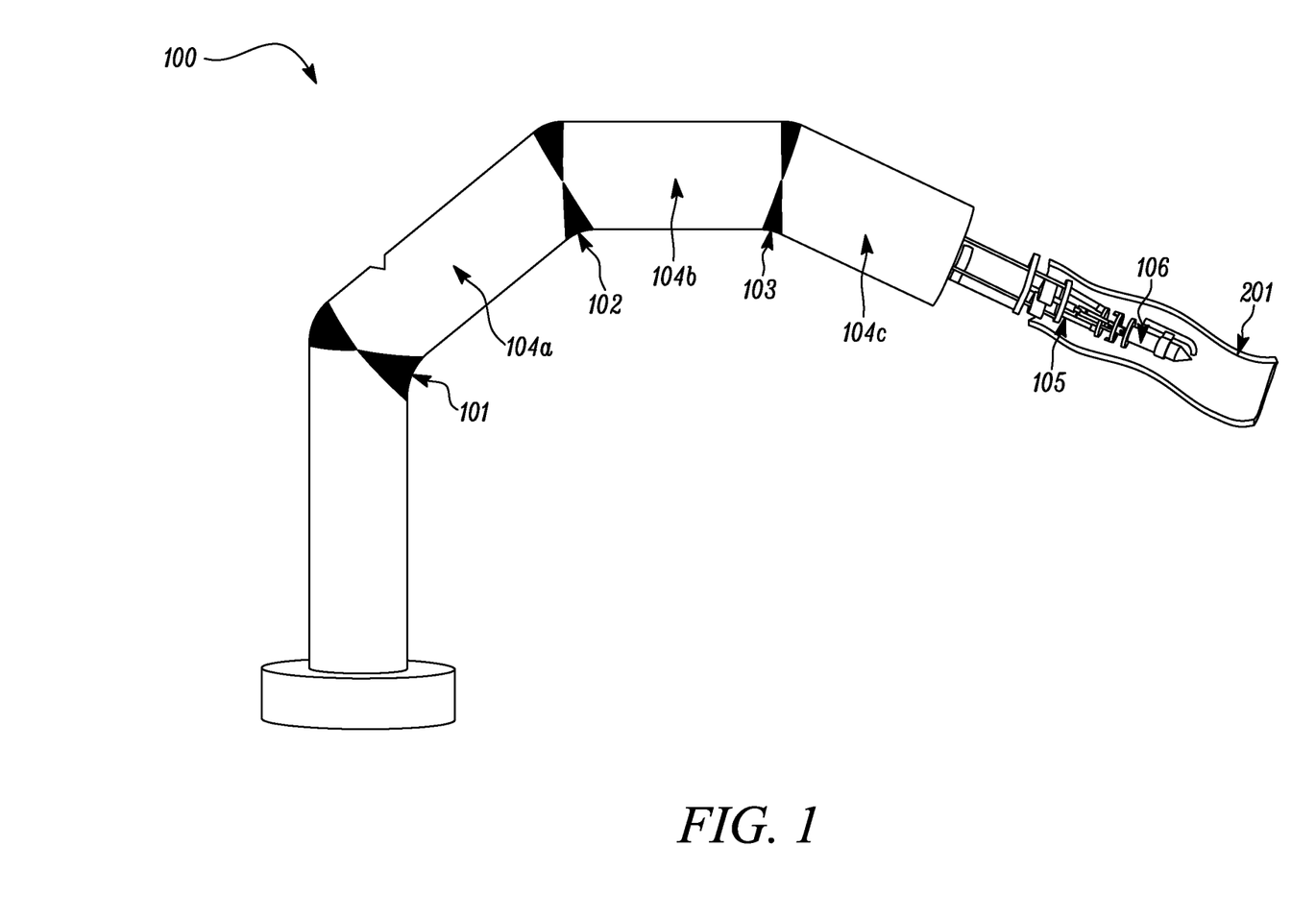
FIG. 1 presents an example of a robotic arm according to the present disclosure.

FIG. 1 presents an example of a welding robot according to the present disclosure. The welding robot consists of a micromanipulator, which in this case is the robot arm, and a micromanipulator. The welding robot arm 100 is shown having six articulation points 101, 102, 103, 104, 105, 106. The presence of the articulation points breaks the total length of the robot down into smaller sections 107a, b, c, d, e. The articulation points are positioned at the connecting points between the sections. Each articulation point allows for a change in the twist and tilt angle of the subsequent section relative to the proceeding section. This allows the robot to move in multiple planes within a three-dimensional geometry and provides it with its 6 degrees of freedom. The manipulation of these joints and the separation of the sections allows the end effector to trace a path over a surface of a complex shape. Each section has its own actuators which control the angle and position of articulation point. The actuators for the robotic arm may be any suitable manipulator. For example, this may be off-the-shelf actuators such as, servo motor, harmonic motor, etc. The actuators also provide stability to the robotic arm sections so that the end effector can be held in position and the job can be performed accurately. The use of the actuators also allows for the robot to be moved over larger work areas to the desired target area. The movement of the articulation points and as such the robot is controlled by signals from a robot controller which is coupled to a computer. The computer is provided with a program for controlling the robot arm. In doing so, the program executes a series of instructions which it sends to the robot controller, these in turn provides the required signal to actuators to move them. The program is typically pre-programmed such that the robot arm follows a predetermined path. At the distal end of the robot arm is the micromanipulator 108. In the example shown a welding tool 109 is mounted to the micromanipulator and is positioned within a confined work area 110. The presence of the micromanipulator provides more accurate control over the end effector/welding tool; this is because the micromanipulator moves the end effector over a smaller range of distances than the robot arm. This finer control over the motion results in more accurate positioning of the end effector tool. This combination of robot arm and a micromanipulator at the end of the robot allows the end effector to be inserted into confined spaces such as pipes or conduits or cavities where a human operator or conventional welding robots would not be able to access. The presence of the micromanipulator also allows for finer movement of the end effector and allows for a smoother path to be traced by the end effector and allows the robot to perform more complex tasks. Thus, the process of operation is to use the robot arm to locate the end effector and welding torch close to the welding zone. Once in position the robotic arm moves into the desired positions, whilst the micromanipulator works to adjust the position of the end effector, so that it more closely follows the desired path. As part of this the micromanipulator is used to perform rapid and precise movements over the welding zone whilst the robot arm performs the larger displacements and at a reduces speed compared to the micromanipulator.

Figure 2:
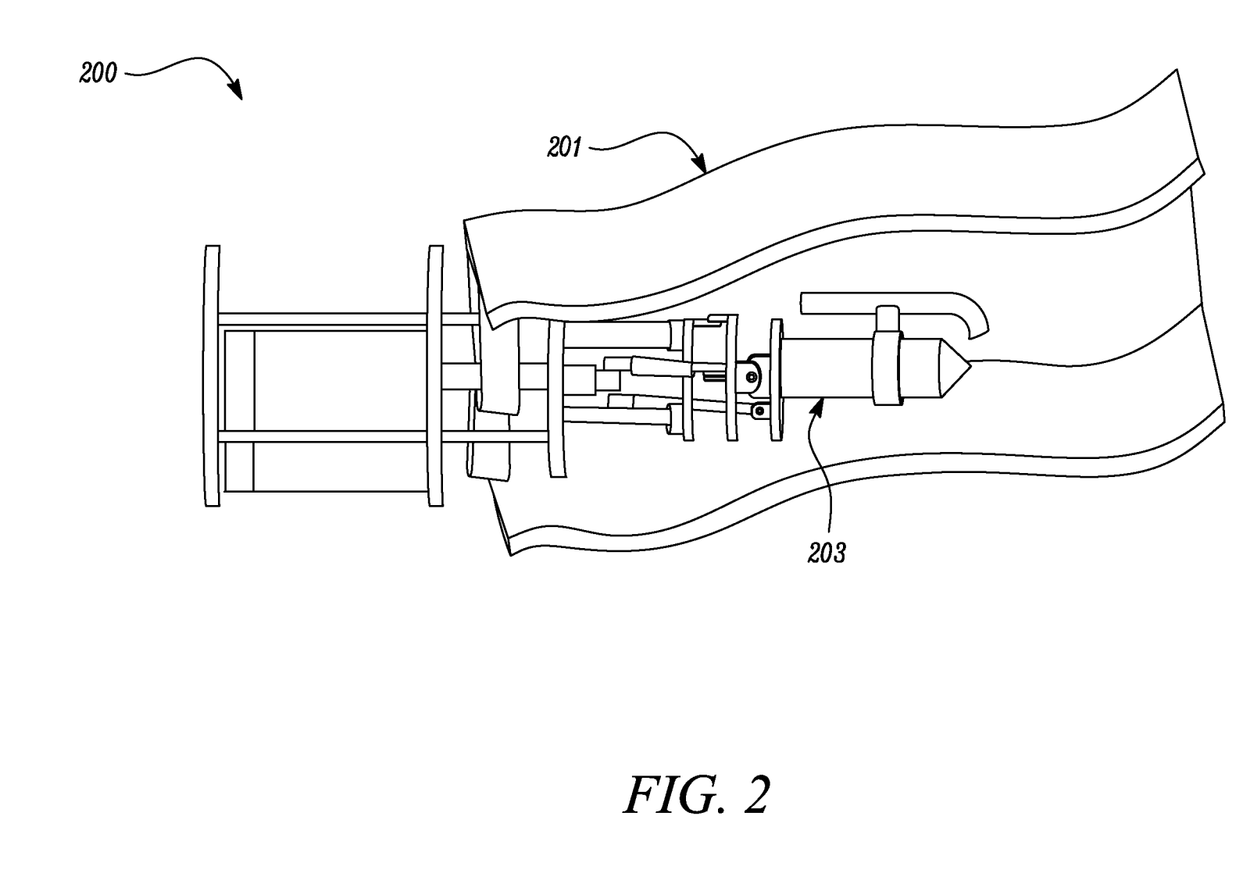
FIG. 2 presents a close up of the end effector being used as part of a welding robot according to the present disclosure.

FIG. 2 presents a close up of the micromanipulator 200 being used as part of a welding robot according to the present disclosure. The figure presents the welding robot operating within a confined space 201, which would be impossible for a conventional welding robot. In this figure the robot has been positioned so only micromanipulator 202 and the end effector/welding tool 203 is the only part of the robotic arm that extends into the confined space 201. The end effector may be designed to be narrower than the robotic arm so that it can be inserted into the confined space. The welding torch in the example presented is mounted on the distal end of the micromanipulator. The welding torch has its own gas feed that may be fed through the centre of the robot arm. Alternatively, the gas supply may be fed along the outside of the arm in a suitable flexible conduit. The gas exits the arm at a nozzle which is mounted to the end of the micromanipulator. The nozzle can be made of any suitable metallic material. The nozzle may also have any suitable sized aperture for the welding process. The gas supply line may be provided with a remotely controllable valve so that the supply of gas to the nozzle can be controlled. An igniter may also be provided for the gas supply, so that the gas from the nozzle can be lit and the welding process can start. The igniter may be any suitable ignition means. For example, it may be a piezoelectric igniter. A wire feed mechanism may also be present to supply the desired feed of wire to the welding area. The wire may be any suitable material for the job and have any suitable profile or size.

Figure 3:
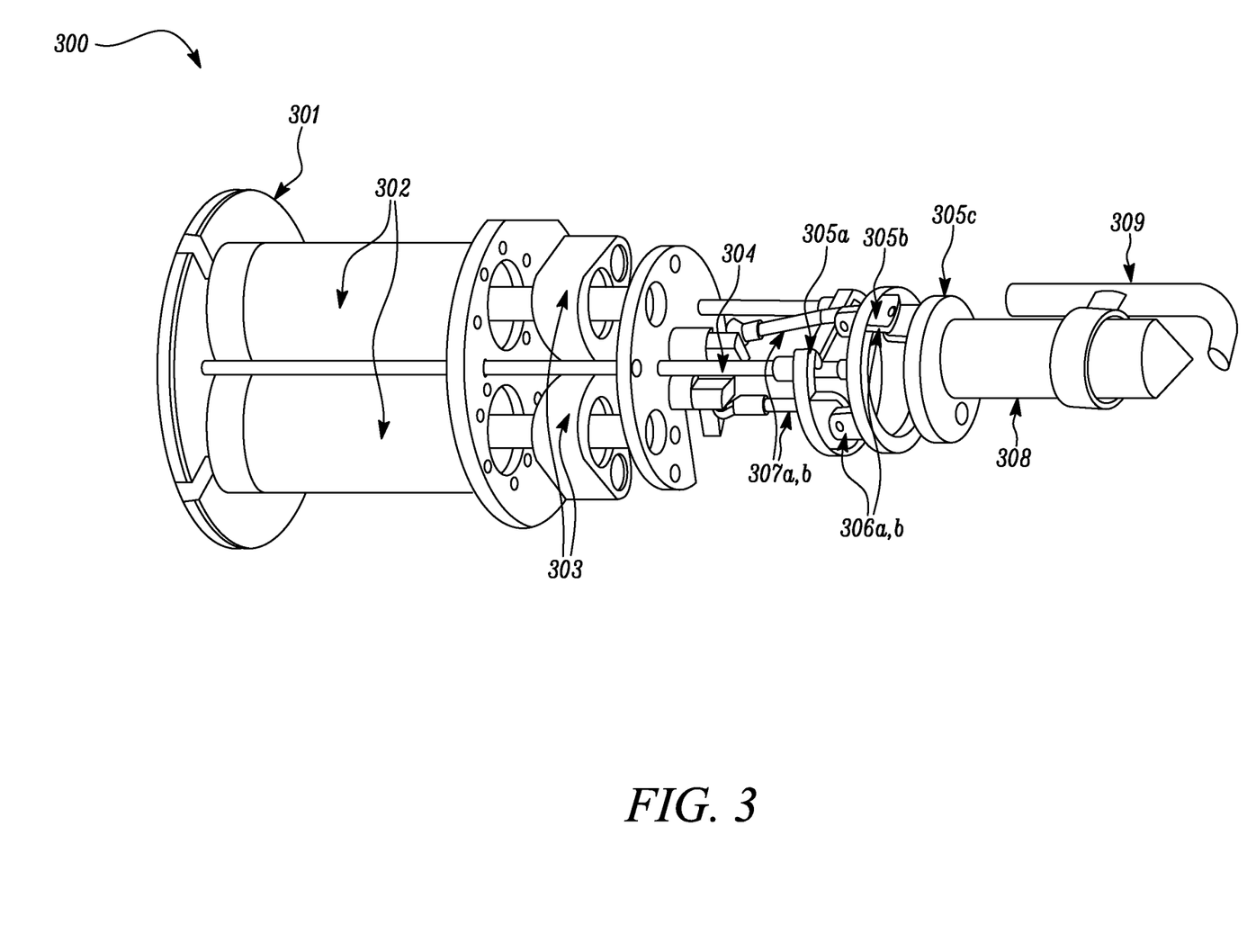
FIG. 3 presents a close up of the micromanipulator.

FIG. 3 presents a close up of the micromanipulator 300. The micromanipulator has a connector 301 at the proximal end of the micromanipulator; this connector allows the micromanipulator to be connected to the end-effector of robot arm. The connector may be any suitable type of connector depending upon the type of robot being used. For example, the connector may be suitable to fit an ABB type robot, a KUKA robot or a UR robot. The micromanipulator is shown having a plurality of plates through the body. These plates may be made from any suitable material. This may be plastics or metallic. The plates may be replaced by other structural features instead such as an outer frame. A plurality of rigid rods 312 are used to connect connector 301, middle plate 310, and upper plate 311. Attached to the middle plate are a plurality of motors 302, which are responsible for the movement of the micromanipulator. The motors may be any suitable motors such as DC motors or servo motors. The motors are connected to the middle plate base and are associated with respective slider sections 303. The movement of the motors results in the slider sections being moved in or out which changes their transitional positions, constrained by upper plate 311. A plurality of rigid rods 304 are connected to the base section 305a to hold the base section in a fixed position. A first rotational joint 306a is provided between the base 305a and the first rotational joint section 305b. The first rotational joint section is connected to one of the linking rods 307a that are connected to one of the slider sections. Movement of the slider rod causes the angle of the rotational joint to tilt about the rotatable joint. A second rotational joint 306b is provided between the first rotational joint section 305b and the second rotational joint section 305c. The second rotational joint section is connected to one of the linking rods 307b that are coupled to the second slider. Movement of this slider results in the rotational joint tilting about the joint. The first and second rotational joints are orthogonally offset. Attached to the rotational joint sections at the end of the distal end of the micromanipulator is a welding torch 308. Attached to the welding torch is the wire feeder 309. Although shown as attached to the welding torch, the wire feeder may be connected to any suitable point of the micromanipulator.

Figure 4A:
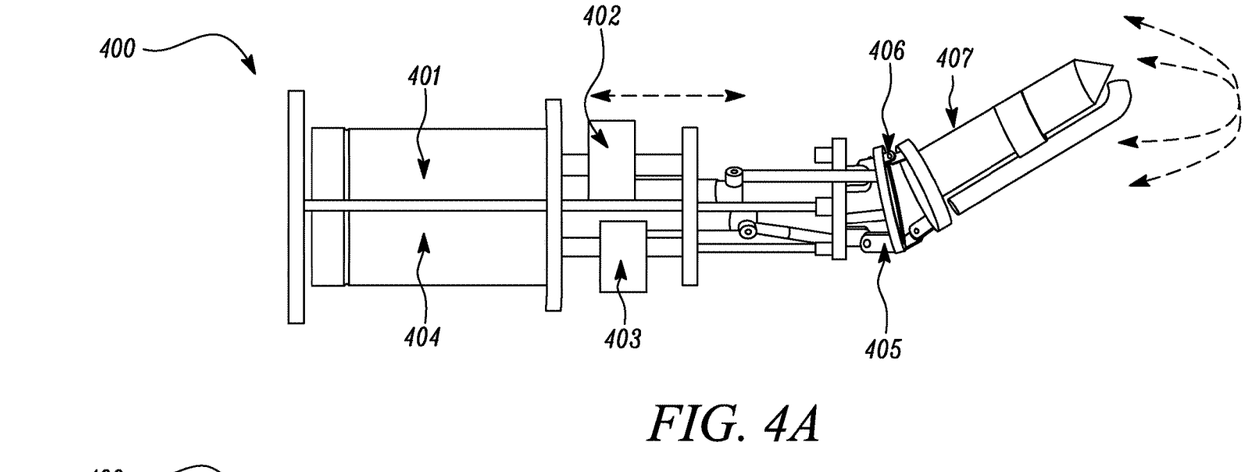
FIGS. 4a and 4b present examples of the movement of the micromanipulator with a welding torch attached to the end.
Figure 4B:
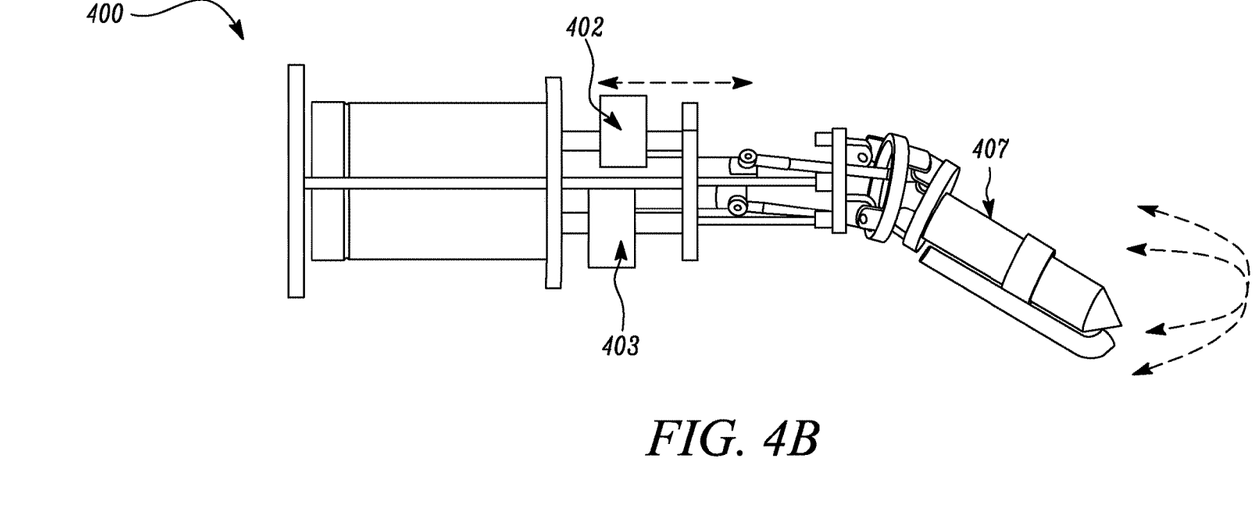

FIGS. 4a and 4b present examples of the movement of the micromanipulator 400 with a welding torch attached to the end. In FIG. 4a, the first slider 402 is in its neutral position, which keeps the first rotational joint section 405 in its neutral position. The second slider 403 is in its neutral position, which keeps the second rotational joint section 406 in its neutral position. The combination movements of the two sliders results in the neutral position of welding torch 407.

In FIG. 4b the first slider 402 has been pushed by the first motor 401 away from a neutral position which push the side of the first rotational joint section 405 away from the base of the micromanipulator. The motion of the second motor 404 retracts the second slider 403. This retraction of the slider pulls the edge of the second rotational joint section 406 close to the base of the micromanipulator. This combination movements of the two sliders results in a tilt in the end-effector and allows the welding torch 407 further movement. This shown movement results in a motion of the welding torch being pivoted in a downward direction. The use of the two rotational joints with the push rod configuration allows for the welding tool to be translatable with a spherical range sphere movement. However, this is just an example of movement for the micro-manipulators and other movement patterns can be achieved by adding more degree of freedom.

The robot arm is coupled to a computer. The computer has the memory, processing power and ability to run the control software that controls the motion of the robotic arm and welding tool. A high frequency data exchange is established between the computer and the end-effector to achieve a real-time control. This kind of data exchange can be built based on Ethercat or CANopen. By adding extra sensors or design advanced controllers, the performance of the proposed end-effector can be further improved.

Although, the micromanipulator has mostly been described by way of a welding tool the same operation could also be used for other mechanical processes. For example, this may be in the use of grinding or boreblending operations over complex or inaccessible surfaces. In these cases rather than having the welding tool at the proximal end of the end effector the welding tool is replaced by a rotating abrasive tool, such as a grinding disc, or other such useable tool. Furthermore, although the images shown the robot being a rigid based 6 DoF robot, the robot may also be a continuum arm or flexible robot.

The system consists of a serial robot arm combined with a micromanipulator. The joining of the two manipulator sections is based on a parallel architecture. To the end of the micromanipulator a welding device may be mounted. Although the document has discussed this in terms of a welding device any suitable end effector tool may be used. For example, this could be a gluing too, or a painting or a spraying tool. The described architecture allows for the dexterity and precision of the micromanipulator to be exploited to reach confined spaces and to reduce the dynamic effects associated with high accelerations and speeds. Further, the collaborative approach for the robot arm and micromanipulator has the following advantages: it allows for a welding system to operate in confined spaces. This overcomes the limitations of conventional welding robots. Additionally, the low mass and reduced size of the micromanipulator reduces the dynamic effects that could negatively affect welding operations. Therefore, the combination of a serial robot arm with a micromanipulator enables the use of the system over large workspaces and enables the system to adapt to multiple configurations. This can be used to perform welding operations on different complex components that would normally require disassembly to work on.

Figure 5:
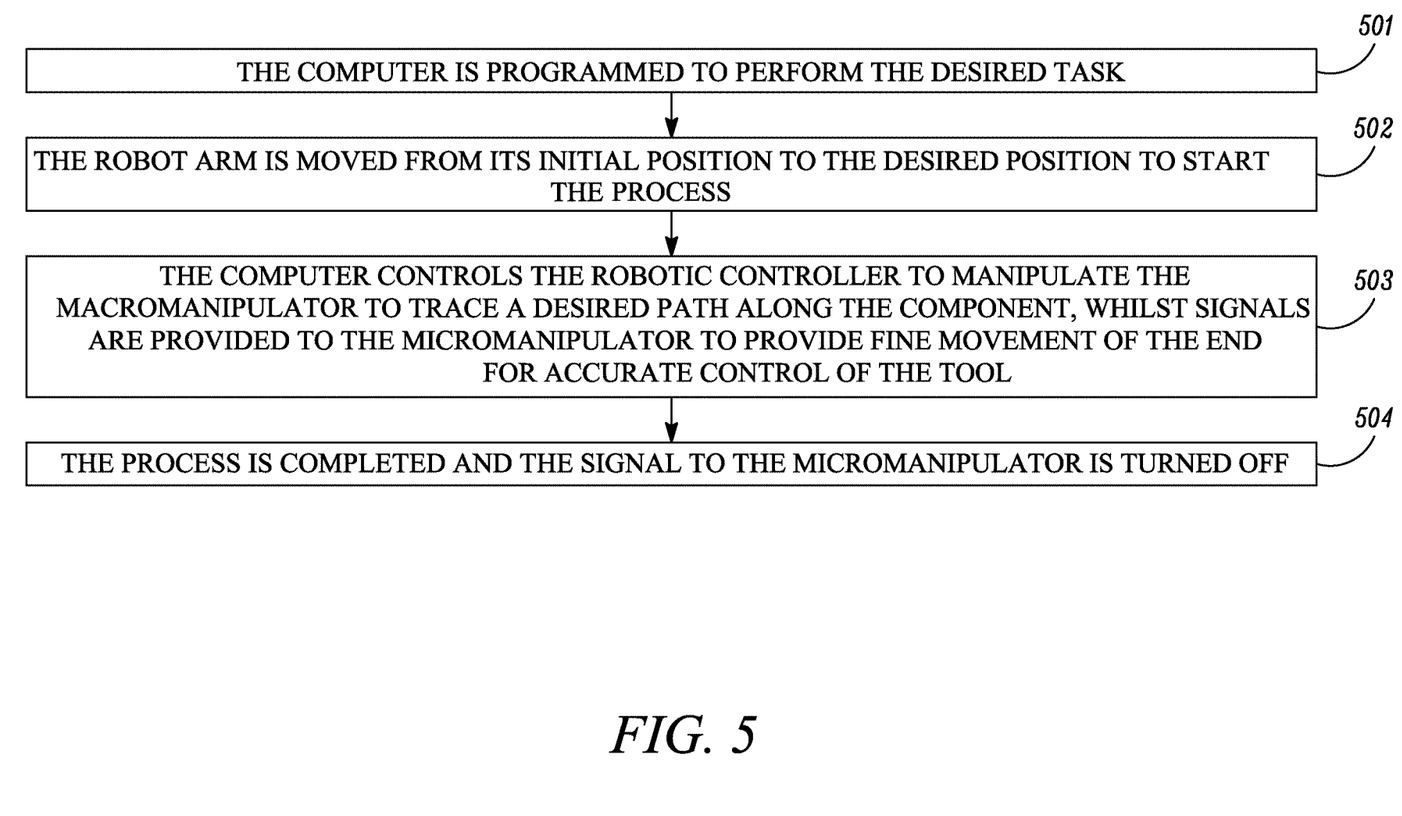
FIG. 5 presents a flow chart of the operation of a robotic arm having the micromanipulator according to the present disclosure.

FIG. 5 presents a flow chart of the operation of a robotic arm having the micromanipulator according to the present disclosure. In step 501 the computer is programmed to perform the desired task. The programming of the program provides the co-ordinates through which the robot arm is to move during the process. In step 502 the robot arm is moved from its initial position to the desired position to start the process. The initial position is a safe position which is away from the component. Alternatively, if multiple processes are to be performed on the component it is the position of the last process. In step 503 the computer controls the robotic controller to manipulate the robot arm to trace a desired path along the component, whilst signals are provided to the micromanipulator to provide fine movement of the end effector for accurate control of the tool. Continuous signal may be provided to the micromanipulator so that it is continuously moving whilst the task is being performed, this can provide the small corrections that are required for the tool to be able to follow a smooth path, which is not just subject to the limitations of the robot arm. In step 504 the process is completed and the signal to the robot arm and micromanipulator are turned off, and the robot arm and the micromanipulator stops moving.

It will be understood that the invention is not limited to the embodiments above-described and various modifications and improvements can be made without departing from the concepts described herein within the scope of the following claims.

We claim:

1. A micromanipulator for mounting on an end of a macromanipulator, the micromanipulator comprising:
   a connection plate with a first motor and a second motor connected to a rigidly mounted base section,
   a first rotational section connected to the base section about a first pivotable axis, the first rotational section being further connected to the first motor via a first slider rod, and
   a second rotational section connected to the first rotational section about a second pivotable axis, the second rotational section being further connected to the second motor via a second slider rod,
   wherein a first rotational joint between the base section and the first rotational section and a second rotational joint between the first rotational section and the second rotational section are offset by 90°.

2. The micromanipulator according to claim 1, wherein a tool is connected to the second rotational section.

3. The micromanipulator according to claim 2, wherein the tool is a welding torch having a gas supply and an igniter.

4. The micromanipulator according to claim 3, wherein a wire feeder is connected to the welding torch.

5. The micromanipulator according to claim 1, wherein the base section is held in position by at least two rigid rods mounted to an upper plate.

6. The micromanipulator according to claim 1, wherein the base section is mounted to a housing which is connected to an upper plate and surrounds the first motor and the second motor.

7. The micromanipulator according to claim 1, wherein the first motor and the second motor are DC motors or servo motors.

8. The micromanipulator according to claim 1, wherein the first slider rod and the second slider rod have a break with a connector section to offset a position of a distal end of the first slider rod and the second slider rod to a proximal end.

9. A robotic arm tool, comprising a six degrees of freedom robot having positionally manipulatable sections, wherein at a distal end is the micromanipulator according to claim 1.

10. The robotic arm tool according to claim 9, wherein the robotic arm tool is connected to a robot arm controller, which is in turn connected to a computer having a program for controlling the robotic arm tool.

11. A method for operating the robotic arm tool according to claim 9, comprising:
   moving the robotic arm tool from an initial position to a desired position; and
   manipulating actuators to trace a desired path along a component, whilst signals are provided to the micromanipulator to provide fine movement of an end effector for accurate control of the robotic arm tool.

12. The method according to claim 11, further comprising controlling a tool that is connected to an end of the micromanipulator.

\* \* \* \* \*